(12) United States Patent  (10) Patent No.: US 7,699,503 B2
Etori  (45) Date of Patent: Apr. 20, 2010

(54) LIGHT CONTROL FILM AND BACKLIGHT UNIT USING THE SAME

(75) Inventor: Hideki Etori, Saitama (JP)

(73) Assignee: Kimoto Co., Ltd. (JP)

( * ) Notice: Subject to any disclaimer, the term of this patent is extended or adjusted under 35 U.S.C. 154(b) by 380 days.

(21) Appl. No.: 10/591,473

(22) PCT Filed: Mar. 2, 2005

(86) PCT No.: PCT/JP2005/003531

§ 371 (c)(1), (2), (4) Date: Sep. 1, 2006

(87) PCT Pub. No.: WO2005/085916

PCT Pub. Date: Sep. 15, 2005

(65) Prior Publication Data

US 2007/0183050 A1 Aug. 9, 2007

(30) Foreign Application Priority Data

Mar. 3, 2004 (JP) ............................. 2004-059607

(51) Int. Cl.
*F21V 5/00* (2006.01)
(52) U.S. Cl. .................. 362/331; 362/335; 362/337; 362/339; 362/606; 362/618
(58) Field of Classification Search .............. 362/331, 362/335, 337, 339, 606, 607, 618, 619, 627
See application file for complete search history.

(56) References Cited

U.S. PATENT DOCUMENTS 6,505,959 B2 * 1/2003 Masaki et al. .............. 362/339
6,752,505 B2 * 6/2004 Parker et al. ................ 362/627
2005/0038137 A1 * 2/2005 Yoshihara et al. ........... 523/205

FOREIGN PATENT DOCUMENTS

| JP | 7-198911 | 8/1995 |
| JP | 9-127314 | 5/1997 |
| JP | 9-179113 | 7/1997 |
| JP | 2000-75136 | 3/2000 |
| JP | 2001-235606 | 8/2001 |
| JP | 2001-356207 | 12/2001 |
| JP | 2002-182017 | 6/2002 |
| JP | 2003-29007 | 1/2003 |
| JP | 2004-29091 | 1/2004 |
| WO | 00/34806 | 6/2000 |
| WO | 03/044572 | 5/2003 |

* cited by examiner

*Primary Examiner*—Sandra L O'Shea
*Assistant Examiner*—Meghan K Dunwiddie
(74) *Attorney, Agent, or Firm*—Bacon & Thomas, PLLC

(57) ABSTRACT

A light control film enabling improvement in front luminance, having appropriate light diffusing property and free from problems of interference pattern, glare etc. is provided.

A light control film 10 having a rough surface as one surface and a substantially smooth surface as the other surface is constituted so that total light transmission of the film for lights entered from the smooth surface should be not more than 65%, total light transmission of the film for lights entered from the rough surface should be not less than 80%, as measured according to the measurement method defined in JIS K7361-1:1997, and a value obtained by subtracting the total light transmission for smooth surface incidence from the total light transmission for rough surface incidence should be not less than 30%.

30 Claims, 8 Drawing Sheets (a)

(b)

(a)

(b)

(a)

(b)

(c)

LIGHT CONTROL FILM AND BACKLIGHT UNIT USING THE SAME

TECHNICAL FIELD

The present invention relates to a light control film used for backlight units such as those for liquid crystal displays and so forth, and a backlight unit using the same.

BACKGROUND ART

For liquid crystal displays and so forth, backlight units of the edge light type or direct type are conventionally used. Since backlight units of the edge light type themselves can be manufactured with a small thickness, they are used for notebook computers etc., whereas backlight units of the direct type are used for large-sized liquid crystal television etc. in many cases.

Lights emerging from these conventional backlight units contain components emerging along directions significantly inclined from the front direction. Lights emerging from backlight units of the edge light type, in particular, contain a lot of components emerging along directions significantly inclined from the front direction, and thus it is difficult to obtain high front luminance.

Therefore, in the conventional backlight units, two or more optical films such as prism sheets and light diffusive films are used in combination in order to improve front luminance so that directions of lights should be directed to the front direction (see, for example, Patent document 1).

Although prism sheets can increase the ratio of lights emerging along the front direction (direction perpendicular to film surface) by surface design based on geometric optics. However, they have drawbacks that they are likely to suffer from an interference pattern due to regularly arranged convex portions, and that they cause glare if they are used alone and thus they impair visibility of images. Moreover, they unduly concentrate lights along the front direction, and therefore they cannot provide a wide view angle.

On the other hand, if diffusion films are used alone, the front luminance becomes insufficient, although the aforementioned problems are not caused.

Therefore, a prism sheet and a light diffusive film are used in combination as described above. However, the front luminance enhanced by the prism sheet is reduced by the use of the light diffusive film. Moreover, lamination of the films may generate Newton rings between the members, or scratches and so forth generated due to the contact of the members may cause a problem.

Patent document 1: Japanese Patent Unexamined Publication (KOKAI) No. 9-127314 (claim 1, paragraph 0034)

DISCLOSURE OF THE INVENTION

Problems to be Solved by the Invention

Therefore, an object of the present invention is to provide a light control film that can surely improve front luminance when it is used alone or in combination with a prism sheet, has an appropriate light diffusing property, and does not suffer from the problems of interference pattern and glare, and a backlight unit using the same.

In order to achieve the aforementioned object, the inventor of the present invention conducted various researches on optical characteristics of light control film, and as a result, it was found that lights entered into a light control film could be efficiently directed to the front direction (emerging direction) by controlling light transmission of the light control film to be within an appropriate range.

More specifically, it was found that superior front luminance could be achieved, if, when total light transmission of a light control film having a rough surface as one surface and a substantially smooth surface as the other surface was measured, total light transmission for lights entered from the rough surface (Tr) and total light transmission for lights entered from the smooth surface (Ts) were within specific ranges, respectively, and difference of the total light transmissions for lights entered from the rough surface and lights entered from the smooth surface (Tr−Ts) was within a specific range, and thus the present invention was accomplished.

Means for Achieving the Object

That is, the light control film of the present invention is a light control film having a rough surface as one surface and a substantially smooth surface as the other surface, wherein total light transmission of the film for lights entered from the smooth surface (Ts) is not more than 65% and not less than 20% as measured according to the measurement method defined in JIS K7361-1:1997.

The light control film of the present invention is also a light control film having a rough surface as one surface and a substantially smooth surface as the other surface, wherein total light transmission of the film for lights entered from the smooth surface (Ts) is not more than 65%, total light transmission of the film for lights entered from the rough surface (Tr) is not less than 80%, as measured according to the measurement method defined in JIS K7361-1:1997, and a value obtained by subtracting the total light transmission for smooth surface incidence (Ts) from the total light transmission for rough surface incidence (Tr) is not less than 30.

The difference between the total light transmission (Tr) and total light transmission (Ts) is preferably not less than 40. Preferably, the difference does not exceed 80.

The backlight unit of the present invention is a backlight unit comprising a light control film, wherein the light control film of the present invention is used as the light control film. Specifically, the backlight unit of the present invention is a backlight unit comprising a light guide-plate equipped with a light source on at least one end portion thereof and having a light emergent surface approximately perpendicular to the end portion, and a light control film provided on the light emergent surface of the light guide plate, wherein the aforementioned light control film is used as the light control film.

The backlight unit of the present invention is also a backlight unit comprising a light source, a light diffusive plate provided on one side of the light source and a light control film provided on the side of the light diffusive plate opposite to the light source side, wherein the light control film of the present invention is used as the light control film.

In the backlight unit of the present invention, the light control film is preferably disposed so that the substantially smooth surface of the film should face the light guide plate or the light source.

The backlight unit of the present invention may be provided with a prism sheet between the light control film and the light guide plate of the aforementioned backlight unit.

EFFECT OF THE INVENTION

The light control film of the present invention exhibits high front luminance has appropriate light diffusing property and does not generate glare and interference pattern.

Further, the backlight unit of the present invention is a backlight unit providing high front luminance, having appropriate light diffusing property, and not generating glare and interference pattern, because it uses the particular light control film. Moreover, it can prevent generation of scratches on a prism sheet due to contact with other members and so forth.

Hereafter, the reasons why the superior front luminance can be obtained with the light control film of the present invention by defining the total light transmissions as described above will be explained in detail.

In the measurement of total light transmission described in JIS K7361-1:1997, it is specified that parallel lights should be used as incident lights. If total light transmission of a film having a rough surface as one surface and a smooth surface as the other surface is measured according to the definition of JIS K7361-1:1997, the amount of lights transmitting the film, i.e., the total light transmission, may differ for parallel lights entering from the rough surface and those entering from the smooth surface as shown in FIGS. 1(a) and (b), because the refractive index of the film differs from the refractive index of the outside (air).

That is, since the refractive index of the film is larger than the refractive index of air (n=1), if it is assumed that the lights are not substantially reflected by the incident surface of the film, substantially all the lights enter into the light control film for both cases where the lights enter from the smooth surface and where the lights enter from the rough surface. However, when the lights enter from the rough surface, the lights become to have distribution of incident angles determined according to distribution of slopes of the rough surface of the film as shown in (a), thus they are refracted at the incident surface according to the difference of refractive indexes of the outside and the film, and have various angles with respect to the smooth surface, unlike the case where the lights enters from the smooth surface.

If slope of the rough surface with respect to the smooth surface is represented by θ, the incident angles of lights used for the measurement with respect to the rough surface are θ, and the incident angles φ with respect to the smooth surface can be represented by the following equation (1), wherein nf is the refractive index of a substance constituting the rough surface of the light control film.

[#1]

$$\phi_i = \theta_i - \sin^{-1}\left(\frac{1}{n_f}\sin\theta_i\right) \quad (1)$$

Since the slope of the rough surface changes with positions, the incident angles φ with respect to the smooth surface also has distribution. When lights with various incident angles emerge from the smooth surface to the outside, they are refracted again due to the difference of the refractive indexes of the outside and the film. However, since the lights advance from a material of a larger refractive index to a material of a smaller refractive index at this interface, a light having an incident angle exceeding a critical angle is totally reflected. That is, when the refractive index of the material on the incident side is represented by ni, the same on the emergent side is represented by no, and ni>no, if the incident angle φ satisfies φ>sin$^{-1}$(no/ni) (equation (2)), the incident light is totally reflected at the interface. The incident angle φ0=sin$^{-1}$(no/ni) is the critical angle. Therefore, as lights having φ satisfying φ>φ0 increase among the incident lights from the smooth surface with change of the slope of the rough surface θ, lights to be totally reflected should increase, and thus the total light transmission becomes smaller.

Specifically, if the refractive index of the substance constituting the rough surface is assumed to be 1.5, which is the refractive index of acrylic resins as common film materials, the critical angle is about 41.8 degrees, and the slope θ of the rough surface providing an incident angle φ larger than the critical angle with respect to the smooth surface is calculated to be 83.3 degrees or larger in accordance with the equations (1) and (2) mentioned above.

On the other hand, when parallel lights perpendicular to the smooth surface enter from the smooth surface as shown in (b), they advance without being refracted at the smooth surface as the incident surface (interface) and refracted when they emerges from the rough surface. Although the lights advancing in the film are parallel lights, the rough surface has an slope with respect to the parallel lights, and therefore when the angle θ of the slope satisfies the condition of the equation (2), the lights are totally reflected, and do not emerge from the rough surface. If the refractive index of the substance constituting the rough surface is assumed also for this case to be 1.5, which is the refractive index of acrylic resins as common film materials, the critical angle is about 41.8 degrees, and the lights are totally reflected at a position where the slope θ of the rough surface exceeds about 41.8 degrees.

If distribution of slopes of the rough surface is considered, the ratio of positions having an slope of 41.8 degrees or more is necessarily larger than the ratio of positions having an slope of 83.3 degrees or more, and therefore the total light transmission (Ts) for the case where lights enter from the smooth surface is necessarily smaller. Thus, it can be understood that the total light transmission is an index representing distribution of slopes of the rough surface, and serves as an index for controlling emergent angles of the lights.

Therefore, the inventor of the present invention incorporated light control films having various rough surfaces into a certain backlight unit so that smooth surfaces should serve as the light incident surface and measured luminance for the front direction (front luminance) to examine the relationship of the front luminance and the two kinds of total light transmissions, Ts and Tr.

As a result, it was found that whereas the total light transmission Tr for the case where a rough surface is the incident surface did not exhibit any definite correlation with front luminance as shown in FIG. 2, there was a tendency that as the total light transmission Ts for the case where a smooth surface is the incident surface became smaller, front luminance became higher as shown in FIG. 3. Specifically, when the total light transmission Ts for the case where a smooth surface is the incident surface is not more than 60%, high front luminance could be attained. FIG. 3(a) is a graph wherein the relationship between the total light transmission Ts and front luminance is plotted for each sample, and FIG. 3(b) is a graph wherein the relationship is approximated with a curve.

The aforementioned tendency was observed because lights emerging from a backlight unit contain not only components of light along the front direction (incident angle to light control film is 0 degree), but also abundant components of light inclined from the front direction, unlike parallel lights used for the measurement of the total light transmission. It is considered that the incident angles with respect to the rough surface of the inclined incident lights are smaller than those of parallel lights, thus they are harder to be totally reflected, and therefore a light control film exhibiting a smaller measurement value of the total light transmission provides higher front luminance.

Further researches revealed that a value obtained by subtracting the total light transmission Ts for smooth surface incidence from the total light transmission Tr for rough surface incidence exhibited the best correlation with the front luminance as shown in FIG. 4, and if the value of Tr−Ts was not less than 30, high front luminance could be obtained. FIG. 4(a) is a graph wherein the relationship between the value of Tr−Ts and the front luminance is plotted for each sample, and FIG. 4(b) is a graph wherein the relationship is approximated with a curve. The reason why the difference of the total light transmission Tr for rough surface incidence and the total light transmission Ts for smooth surface incidence well correlates with front luminance of a backlight unit is that the defined range thereof indirectly reflects a range where a ratio of concavoconvexes having slopes effective for increasing the front luminance by refracting lights entered from the rough surface to the front direction becomes high among rough surfaces having various slopes.

When lights emerging from a backlight unit have only a specific slope with respect to the surface from which they emerge, high efficiency can be obtained by preparing a light control film only with planes having an slope that can direct the lights with the angle of the specific slope to the front direction. However, since a usual backlight unit emits lights with angles of a wide range, imparting distribution of slopes also to the rough surface is effective for efficiently directing such lights to the front direction.

However, it is difficult to prepare a rough surface with controlling distribution of slopes, and it is also difficult to measure the distribution.

In order to determine distribution of slopes of surface convexoconcaves of a light control film, it is necessary to obtain height data of surface profile by measurement using a surface profiler. However, heights of usual surface convexoconcaves used for light control films are about several micrometers to several hundreds of micrometers, and highly precise measurement of profile of surface convexoconcaves having such heights suffers from many problems. In particular, it can be mentioned that when a contact needle type surface profiler is used for the method for measuring the surface profile, measured profiles may vary depending on the shape of the tip of the contact needle. Moreover, there is also a problem that a certain width of area must be measured according to the sizes of concavoconvexes, and measurement for such an area requires enormous time.

As for the light control film of the present invention, a light control film exhibiting higher front luminance can be quickly obtained by measuring total light transmission with changing light incident surface without performing time-consuming profiling of surface convexoconcaves.

Therefore, not only a light control film exhibiting high front luminance can be quickly chosen from those having various convexoconcaves prepared on a trial and error basis, but also production processes can be extremely efficiently managed in a large scale production of such a light control film.

BEST MODE OF CARRYING OUT THE INVENTION

Hereafter, the light control film of the present invention will be further explained with reference to the drawings. The sizes (thickness, width, height etc.) of the elements mentioned in the drawings used for explanation of the present invention are enlarged or reduced as required for explanation and do not reflect actual sizes of the elements of actual light control film and backlight unit.

FIGS. 5(a) to (c) schematically show examples of the light control film of the present invention. As shown in the drawings, the light control film of the present invention has fine convexoconcaves formed on one face of a substantially planar film and has a characteristic profile of the convexoconcaves. The convexoconcaves may be formed on a layer provided on one face of a film used as a substrate as shown in (a) and (b), or the light control film may be constituted with only a layer on which convexoconcaves are formed as shown in (c).

When lights enter into the light control film of the present invention from the surface opposite to the surface on which convexoconcaves are formed and emerge from the rough surface, the light control film of the present invention controls direction of the lights so that components of lights emerging with an angle with respect to the front direction within a predetermined range should increase to enhance front luminance, and light diffusing property which can prevent glares should be provided. In such light control film of the present invention, the total light transmission of the film for lights entered from the smooth surface Ts is not more than 65%, preferably not more than 60%, as measured according to the measurement method defined in JIS K7361-1:1997. The total light transmission of the film for lights entered from the rough surface Tr is not less than 80%, and a value obtained by subtracting the total light transmission Ts from the total light transmission Tr is not less than 30, preferably not less than 40.

In order to obtain sufficient light diffusing property for the light control film of the present invention, the total light transmission Ts is preferably not less than 20%, and the value obtained by subtracting the total light transmission Ts from the total light transmission Tr is preferably not more than 80.

Although the surface opposite to the surface on which convexoconcaves are formed is typically a smooth surface, it is not limited to a smooth surface. For example, it may be slightly matted, or a predetermined dot pattern etc. may be formed on the surface.

Hereafter, specific configurations for preparing the aforementioned light control film will be explained.

As the materials constituting the substrate 11 and the convexo-concave layer 12 of the light control film 10 of the present invention, materials generally used for optical films can be used. Specifically, the material for the substrate 11 is not especially limited so long as a material exhibiting favorable light transmission property is chosen, and plastic films such as those of polyethylene terephthalate, polybutylene terephthalate, polyethylene naphthalate, polycarbonate, polyethylene, polypropylene, polystyrene, triacetyl cellulose, polyacrylate, polyvinyl chloride, and so forth can be used.

The material for constituting the convexo-concave layer 12 is not also especially limited so long as a material exhibiting favorable light transmission property is chosen, and glass, polymer resins, and so forth can be used. Examples of the glass include oxide glass such as silicate glass, phosphate glass, and borate glass. Examples of the polymer resins include thermoplastic resins, thermosetting resins, ionizing radiation curable resins such as polyester resins, acrylic resins, acrylic urethane resins, polyester acrylate resins, polyurethane acrylate resins, epoxy acrylate resins, urethane resins, epoxy resins, polycarbonate resins, cellulose resins, acetal resins, vinyl resins, polyethylene resins, polystyrene resins, polypropylene resins, polyamide resins, polyimide resins, melamine resins, phenol resins, silicone resins, and fluorocarbon resins, and so forth.

Among these materials, polymer resins are preferred in view of workability and handling property, and those having a refractive index (JIS K7142:1996) of about 1.3 to 1.7 are especially preferably used.

Although the convexo-concave layer 12 may comprise light diffusing agents such as beads of organic materials and inorganic pigments, like general light diffusive sheets, they are not indispensable. The light control film of the present invention can exert light diffusing effect to a certain degree by the rough surface itself, even if it does not comprise light diffusing agents. If light diffusing agents are not used, other members are not damaged by light diffusing agents, or light diffusing agents do not separate and fall to generate dusts.

The rough surface formed by the convexo-concave layer 12 has an important role for making the total light transmission of the light control film of the present invention satisfy the conditions mentioned above. The convexo-concave layer forming such a rough surface can be obtained by, for example, arranging multiple convex portions of a specific shape.

Examples of a convex portion of a specific shape include revolution bodies formed by rotating various curves around a rotation axis as a center. Shapes of revolution bodies formed by using various curves and distributions of slope angles of the surfaces of the revolution bodies are shown in FIGS. 6(a) to (e). As evident from the drawings, it can be seen that by changing the shape of the curve, the distribution of slope of the surface of the revolution body can be changed. Among these convex portions having a specific shape, one having a large ratio of surface having a large slope such as the one shown in FIG. 6(e) is particularly preferred, because when lights enter from the smooth surface side, incident angles of inclined incident lights with respect to the surface of such a convex portion become smaller, and thus the emergent lights are likely to proceed toward the front direction.

An example of the rough surface of the light control film formed by arranging a lot of such convex portions is shown in FIG. 7.

These convex portions having a specific shape has a size of about several micrometers to 100 micrometers, and arranged in a number of about 10 to 200,000 portions/mm$^2$ all over the rough surface.

As the method for forming the convexo-concave layer 12, 1) a method of using an embossing roller, 2) a method of using an etching treatment, and 3) a method of using molding with a mold can be employed. However, a production method of using a mold is preferred, because it enables production of light control films having a predetermined convexo-concave layer with good reproducibility. Specifically, the production can be attained by preparing a mold having a profile complementary to that of the rough surface, casting a material constituting the convexo-concave layer such as polymer resins into the mold, curing the material, and taking out the cured material from the mold. When a substrate is used, the production can be attained by casting a polymer resin or the like into the mold, superimposing a transparent substrate thereon, curing the polymer resin or the like, and taking out the cured material together with the transparent substrate from the mold.

Although the method of forming a profile complementary to the rough surface in the mold is not particularly limited, the following methods can be employed. For example, concaves are formed on a plate at an arrangement density of, for example, several thousands of concaves/mm$^2$, by a microdrilling technique using a cutting tool having a specific sectional shape at the tip with controlling the cutting depth, and this plate is used as a mold for molding (female mold). Alternatively, convex portions having a specific shape are formed on a plate so that the arrangement density of the portions should be several thousands of portions/mm$^2$ by a laser microprocessing technique, and this plate is used as a male mold to prepare a mold for molding (female mold).

Although the surface of the light control film opposite to the surface consisting of the rough surface may be smooth, it may be subjected to a fine matting treatment in order to prevent generation of Newton rings when the film is brought into contact with a light guide plate or resin plate, or an antireflection treatment in order to improve light transmission.

Moreover, in order to obtain favorable front luminance, as an optical characteristic of the light control film, the film desirably has a haze of 60% or more, preferably 70% or more. The haze referred to herein is a value of the haze defined in JIS K7136:2000, and is a value obtained in accordance with the equation: Haze (%)=$[(\tau_4/\tau_2)-\tau_3(\tau_2/\tau_1)]\times 100$ ($\tau_1$: flux of incident light, $\tau_2$: total light flux transmitted through a test piece, $\tau_3$: light flux diffused in a unit, $\tau_4$: light flux diffused in the unit and test piece).

Although the total thickness of the light control film is not particularly limited, it is usually about 20 to 300 μm.

The light control film of the present invention explained above is mainly used as a member of a backlight unit constituting a liquid crystal display, illumination signboard, and so forth.

Hereafter, the backlight unit of the present invention will be explained. The sizes (thickness, width, height etc.) of the elements mentioned in the drawings used for explanation of the present invention are enlarged or reduced as required for explanation and do not reflect actual sizes of the elements of actual backlight unit.

The backlight unit of the present invention consists of at least a light control film and a light source. As the light control film, the aforementioned light control film is used. Although the direction of the light control film in the backlight unit is not particularly limited, it is preferably used so that the rough surface should serves as a light emergent surface side. For the backlight unit, a configuration called edge light type or direct type is preferably employed.

A backlight unit of the edge light type consists of a light guide plate, a light source disposed on at least one end of the light guide plate, a light control film disposed on the light emergent surface side of the light guide plate, and so forth. The light control film is preferably used so that the rough surface should serve as the light emergent surface. Further, a prism sheet is preferably used between the light guide plate and the light control film. With such a configuration, a backlight unit exhibiting superior balance of front luminance and a view angle and not exhibiting glare, which is a problem peculiar to a prism sheet, can be provided.

The light guide plate has a substantially plate-like shape at least one of which sides serves as a light incident surface and one of which surfaces perpendicular to the side serves as a light emergent surface, and mainly consists of a matrix resin selected from highly transparent resins such as polymethyl methacrylate. Resin particles having a refractive index different from that of the matrix resin may be added as required. Each surface of the light guide plate may not be a uniform plane, but has a complicated surface profile, or may be subjected to diffusion printing such as a dot pattern or the like.

The light source is disposed for at least one end of the light guide plate, and a cold-cathode tube is mainly used. Examples of the shape of the light source include a linear shape, L-shape, and so forth.

Besides the aforementioned light control film, light guide plate, and light source, the backlight unit of the edge light type may be provided with a light reflector, a polarization film, an electromagnetic interference shield film etc. depending on the purpose.

One embodiment of the backlight unit of the edge light type according to the present invention is shown in FIG. 8. This backlight unit 140 has a configuration that light sources 142 are provided on both sides of a light guide plate 141, and a light control film 143 is placed upside the light guide plate 141 so that a rough surface should be outside. The light sources 142 are covered with light source rear reflectors 144 except for the parts facing the light guide plate 141 so that lights from the light source should efficiently enter into the light guide plate 141. Moreover, a light reflector 146 stored in a chassis 145 is provided under the light guide plate 141. By this configuration, lights emitted from the side of the light guide plate 141 opposite to the emergent side are returned into the light guide plate 141 again to increase lights emerging from the emergent surface of the light guide plate 141.

A backlight unit of the direct type consists of a light control film, and a light diffusive member and a light source disposed in this order on a surface of the light control film opposite to the light emergent surface, and so forth. The light control film is preferably used so that the rough surface should serve as the light emergent surface. Moreover, a prism sheet is preferably used between the light diffusive member and the light control film. With such a configuration, a backlight unit exhibiting superior balance of front luminance and viewing angle and not exhibiting glare, which is a problem peculiar to a prism sheet, can be provided.

The light diffusive member is for erasing a pattern of the light source, and a milky resin plate, a transparent film on which a dot pattern is formed on a portion corresponding to the light source (lighting curtain) as well as a so-called light diffusive film having a convexo-concave light diffusive layer on a transparent substrate, and so forth can be used individually or in a suitable combination.

As the light source, a cold-cathode tube is mainly used. Examples of the shape of the light source include a linear shape, L-shape, and so forth. Besides the aforementioned light control film, light diffusive member, and light source, the backlight unit of the direct type may be provided with a light reflector, a polarization film, an electromagnetic interference shield film, etc. depending on the purpose.

One embodiment of the backlight unit of the direct type according to the present invention is shown in FIG. 9. This backlight unit 150 has a configuration that plural light sources 152 are provided above a light reflector 156 stored in a chassis 155, and a light control film 153 is placed thereon via a light diffusive member 157 as shown in the drawing.

Because the backlight unit of the present invention utilizes a light control film having a specific rough surface as a light control film that controls direction of lights emerging from a light source or a light guide plate, it can improve front luminance compared with conventional backlight units, and suffers from the problem of glare and generation of scratches in less degrees compared with the case of using a prism sheet alone.

EXAMPLES

Hereafter, the present invention will be further explained with reference to examples.

Examples 1 to 5

Five kinds of molds (1) to (5) on which predetermined convexo-concave profiles were formed by a microdrilling technique were prepared, a silicone resin having a refractive index of 1.40 was poured into the mold (1), and an ultraviolet curable resin having a refractive index of 1.50 was poured into the molds (2) to (5). Subsequently, the poured resins were cured, and then taken out from the molds to obtain light control films (1) to (5) having a size of 23 cm (for the direction perpendicular to the light source)×31 cm (for the direction parallel to the light source) (light control films of Examples 1 to 5).

Then, by using a turbidimeter (NDH2000, Nippon Denshoku), total light transmissions of the light control films (1) to (5) were measured according to JIS K7361-1:1997 for the cases of using the smooth surfaces and the rough surfaces as the light incident surface. The results obtained for the light control films (1) to (5) are shown in Table 1. Further, by using the turbidimeter (NDH2000, Nippon Denshoku), hazes of the light control films (1) to (5) were measured according to JIS K7136:2000. The measurement results are also shown in Table 1.

TABLE 1

| | Total light transmission (%) | | | |
|---|---|---|---|---|
| | Incidence from rough surface | Incidence from smooth surface | [Incidence from rough surface] - [Incidence from smooth surface] | Haze (%) |
| Example 1 | 100.00 | 49.40 | 50.60 | 93.55 |
| Example 2 | 100.00 | 51.79 | 48.21 | 88.60 |
| Example 3 | 100.00 | 55.28 | 44.72 | 88.10 |
| Example 4 | 100.00 | 56.88 | 43.12 | 93.04 |
| Example 5 | 100.00 | 63.34 | 36.66 | 79.79 |

As seen from the results shown in Table 1, all the light control films of Examples 1 to 5 showed a total light transmission lower than 65% for the case of using the smooth surfaces as the light incident surface, a total light transmission higher than 80% for the case of using the rough surfaces as the light incident surface, and a value obtained by subtracting the total light transmission for the case of using the smooth surface as the light incident surface from the total light transmission for the case of using the rough surface as the light incident surface being larger than 30%. Moreover, all the light control films of Examples 1 to 5 had a haze of 70% or higher, and thus satisfied the optical characteristics required for obtaining favorable front luminance.

Then, the light control films (1) to (5) were each incorporated into a 15-inch edge light type backlight unit (one cold-cathode tube was provided for each of upside and downside), and front luminance was measured. That is, the light control films (1) to (5) were each disposed on a light guide plate so that the rough surface should serve as the light emergent surface, and the luminance was measured at each emergent angle for the parallel and perpendicular directions with respect to the light source (cold-cathode tubes) positioned at the center of the backlight unit (1 inch=2.54 cm). The results obtained for the light control films (1) to (5) are shown in Table 2 (unit is "cd/m$^2$").

TABLE 2

| | | Luminance (cd/m²) | | | | |
|---|---|---|---|---|---|---|
| | | Example 1 | Example 2 | Example 3 | Example 4 | Example 5 |
| Parallel direction | Left 45 deg. | 925 | 965 | 994 | 1030 | 1050 |
| | Left 30 deg. | 1500 | 1490 | 1490 | 1490 | 1490 |
| | 0 deg. | 1830 | 1760 | 1710 | 1650 | 1610 |
| | Right 30 deg. | 1500 | 1500 | 1490 | 1490 | 1480 |
| | Right 45 deg. | 888 | 936 | 970 | 1010 | 1040 |
| Perpendicular direction | Up 45 deg. | 940 | 1010 | 1060 | 1120 | 1160 |
| | Up 30 deg. | 1640 | 1650 | 1650 | 1660 | 1660 |
| | 0 deg. | 1830 | 1760 | 1710 | 1650 | 1610 |
| | Down 30 deg. | 1670 | 1660 | 1650 | 1640 | 1640 |
| | Down 45 deg. | 971 | 1040 | 1080 | 1140 | 1170 |

It was demonstrated by the results shown in Table 2 that, for the light control films of Examples 1 to 5, only by incorporating one sheet of light control film into the backlight unit, the luminance for emergent angles of 30 degrees or less could be increased, and thus strong emergent lights could be obtained for the front direction.

Comparative Examples 1 to 5

In the same manner as that used in Examples 1 to 5, total light transmissions of commercially available light diffusive sheets (Comparative Examples 1 to 5) were measured according to JIS K7361-1:1997 for the cases of using the smooth surfaces and the rough surfaces as the light incident surface, and hazes of the same were measured according to JIS K7136:2000. The results obtained for Comparative Examples 1 to 5 are shown in Table 3.

TABLE 3

| | Total light transmission (%) | | | |
|---|---|---|---|---|
| | Incidence from rough surface | Incidence from smooth surface | [Incidence from rough surface] - [Incidence from smooth surface] | Haze (%) |
| Comparative example 1 | 100.00 | 71.44 | 28.56 | 96.04 |
| Comparative example 2 | 100.00 | 74.44 | 25.56 | 94.94 |
| Comparative example 3 | 100.00 | 78.36 | 21.64 | 95.70 |
| Comparative example 4 | 92.33 | 77.05 | 15.28 | 98.29 |
| Comparative example 5 | 97.37 | 96.57 | 0.08 | 91.76 |

As seen from the results shown in Table 3, although all the light diffusive sheets of the comparative examples showed a total light transmission higher than 80% for the case of using the rough surface as the light incident surface, they showed a total light transmission higher than 65% for the case of using the smooth surface as the light incident surface, and a value obtained by subtracting the total light transmission for the case of using the smooth surface as the light incident surface from the total light transmission for the case of using the rough surface as the light incident surface being smaller than 30%.

Then, the light diffusive sheets of Comparative Examples 1 and 5 were each incorporated into a 15-inch edge light type backlight unit (one cold-cathode tube was provided for each of upside and downside), and front luminance was measured. That is, the light diffusive sheets were each disposed on a light guide plate so that the rough surface of the light diffusive sheet should serve as the light emergent surface, and the luminance was measured at each emergent angle for the parallel and perpendicular directions with respect to the light source (cold-cathode tubes) positioned at the center of the backlight unit (1 inch=2.54 cm). The results obtained for the light diffusive sheets of Comparative Examples 1 to 5 are shown in Table 4 (unit is "cd/m²").

TABLE 4

| | | Luminance (cd/m²) | | | | |
|---|---|---|---|---|---|---|
| | | Comparative example 1 | Comparative example 2 | Comparative example 3 | Comparative example 4 | Comparative example 5 |
| Parallel direction | Left 45 deg. | 1070 | 1120 | 1160 | 1170 | 1430 |
| | Left 30 deg. | 1500 | 1480 | 1460 | 1460 | 1340 |
| | 0 deg. | 1530 | 1490 | 1460 | 1450 | 1240 |
| | Right 30 deg. | 1490 | 1470 | 1450 | 1450 | 1340 |
| | Right 45 deg. | 1070 | 1120 | 1160 | 1170 | 1420 |
| Perpendicular direction | Up 45 deg. | 1220 | 1280 | 1320 | 1340 | 1650 |
| | Up 30 deg. | 1690 | 1670 | 1650 | 1650 | 1530 |
| | 0 deg. | 1530 | 1490 | 1460 | 1450 | 1240 |
| | Down 30 deg. | 1640 | 1620 | 1600 | 1600 | 1490 |
| | Down 45 deg. | 1230 | 1280 | 1320 | 1330 | 1600 |

As seen from the results shown in Table 4, when the conventional light diffusive sheets were incorporated into the backlight unit, favorable front luminance could not be obtained.

As clearly seen from the results of the aforementioned examples, the light control films of the examples exhibited superior front luminance and appropriate light diffusing property, because they were prepared to have total light transmissions within specific ranges. Further, by incorporating such light control films into a backlight unit, backlight units exhibiting high front luminance and not suffering from glare and generation of a interference pattern could be obtained.

Figure 1:
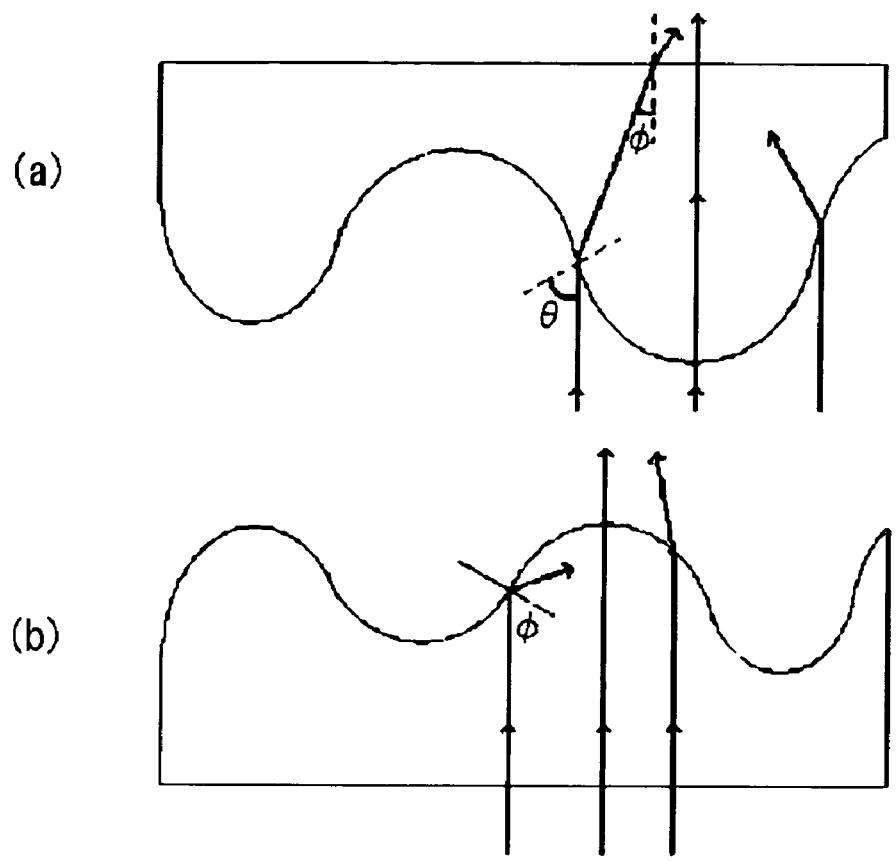
[FIG. 1] Drawing for explaining paths of incident lights entered from a smooth surface and a rough surface
Figure 2:
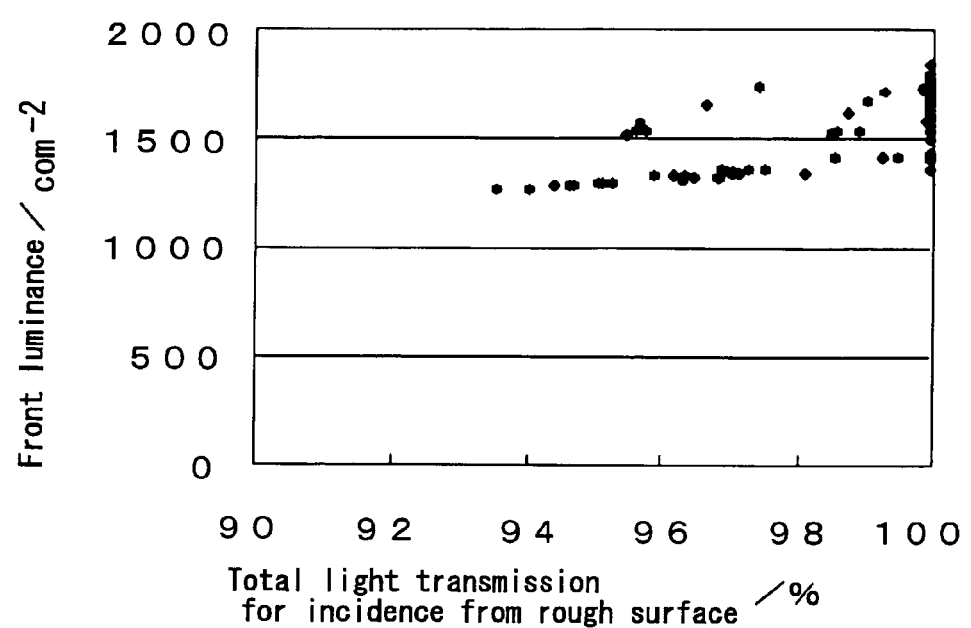
[FIG. 2] Graph showing the relationship between total light transmission for lights entered from a smooth surface and front luminance
Figure 3:
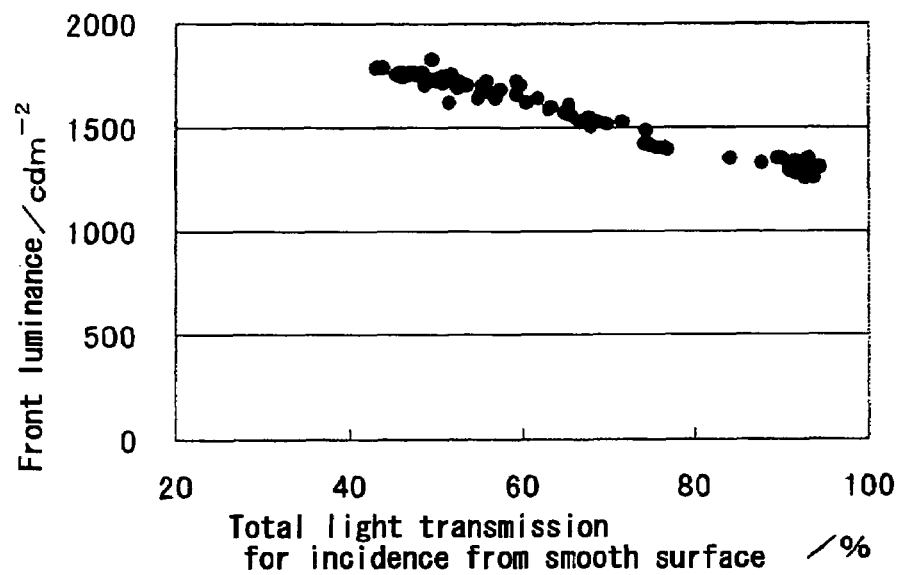
[FIG. 3] Graphs showing the relationship between total light transmission for lights entered from a rough surface and front luminance
Figure 3:
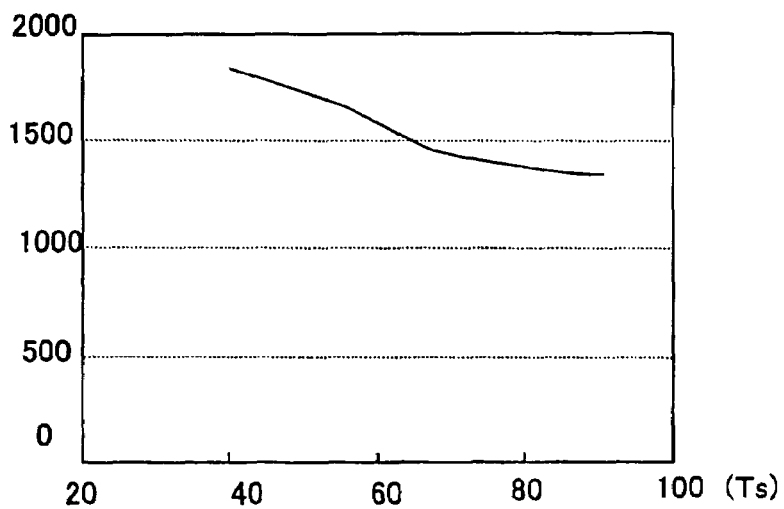
Figure 4:
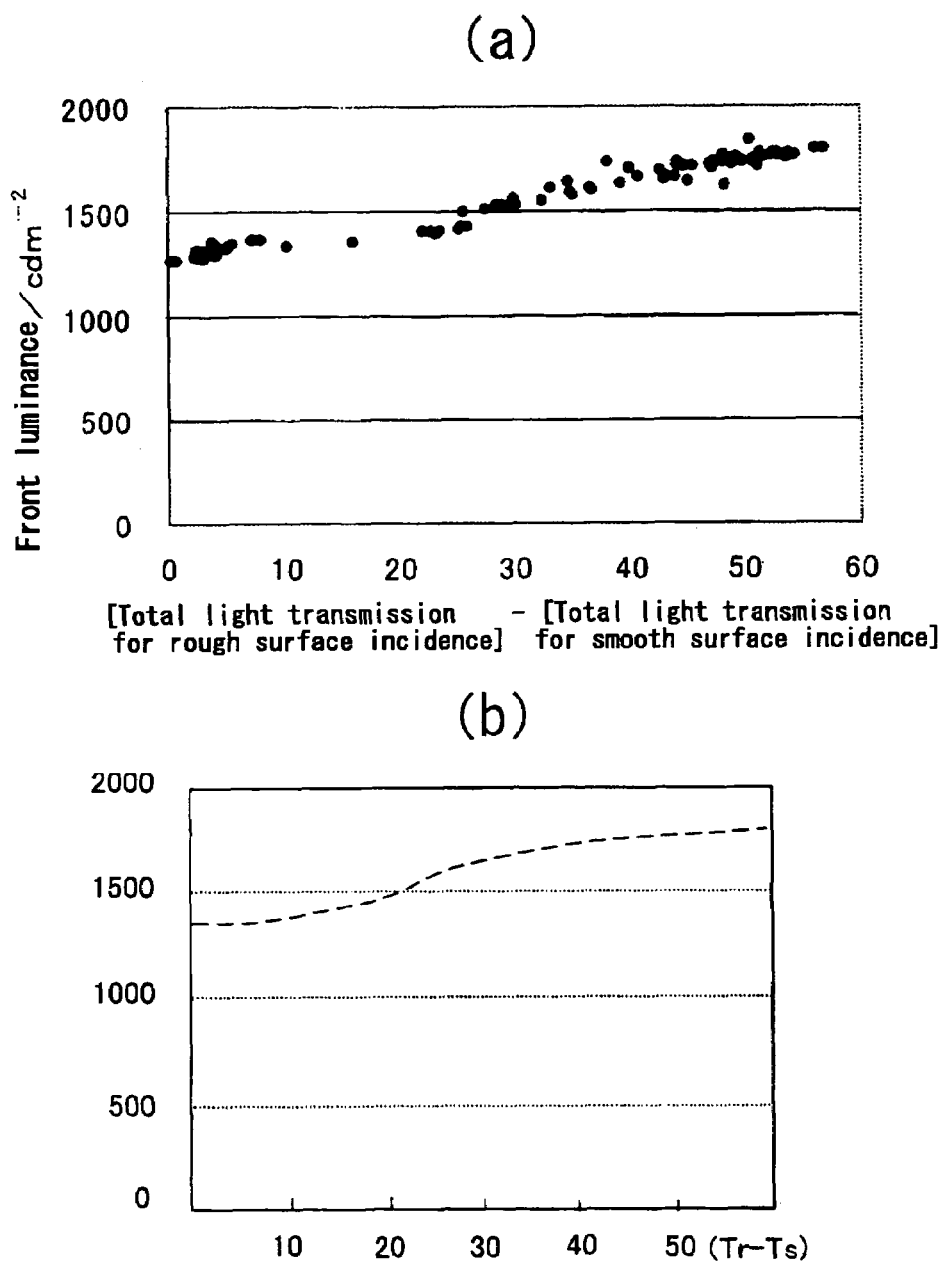
[FIG. 4] Graphs showing the relationship between the value obtained by subtracting the total light transmission for lights entered from the smooth surface from the total light transmission for lights entered from the rough surface and front luminance
Figure 5:
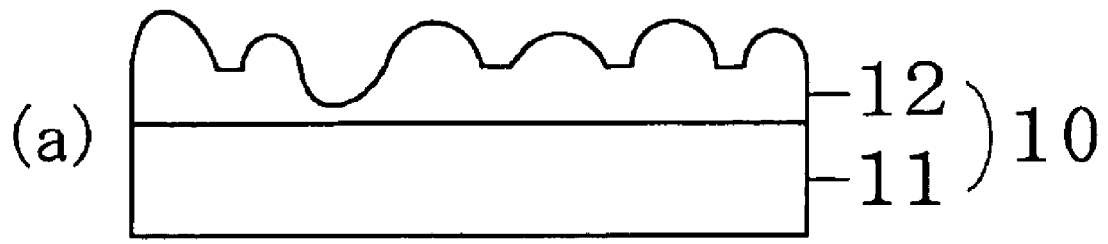
[FIG. 5] Sectional views showing embodiments of the light control film of present invention
Figure 5:
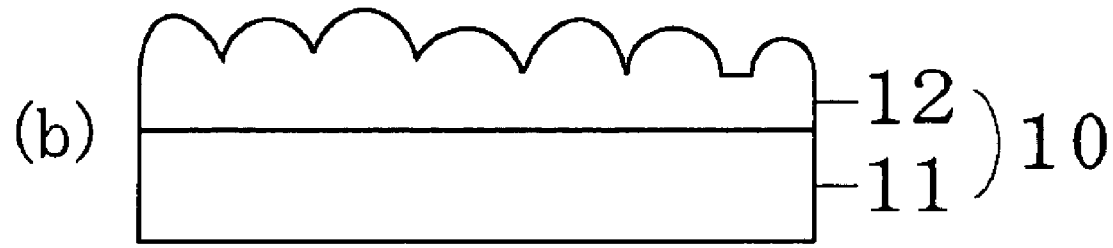
Figure 5:
Figure 6:
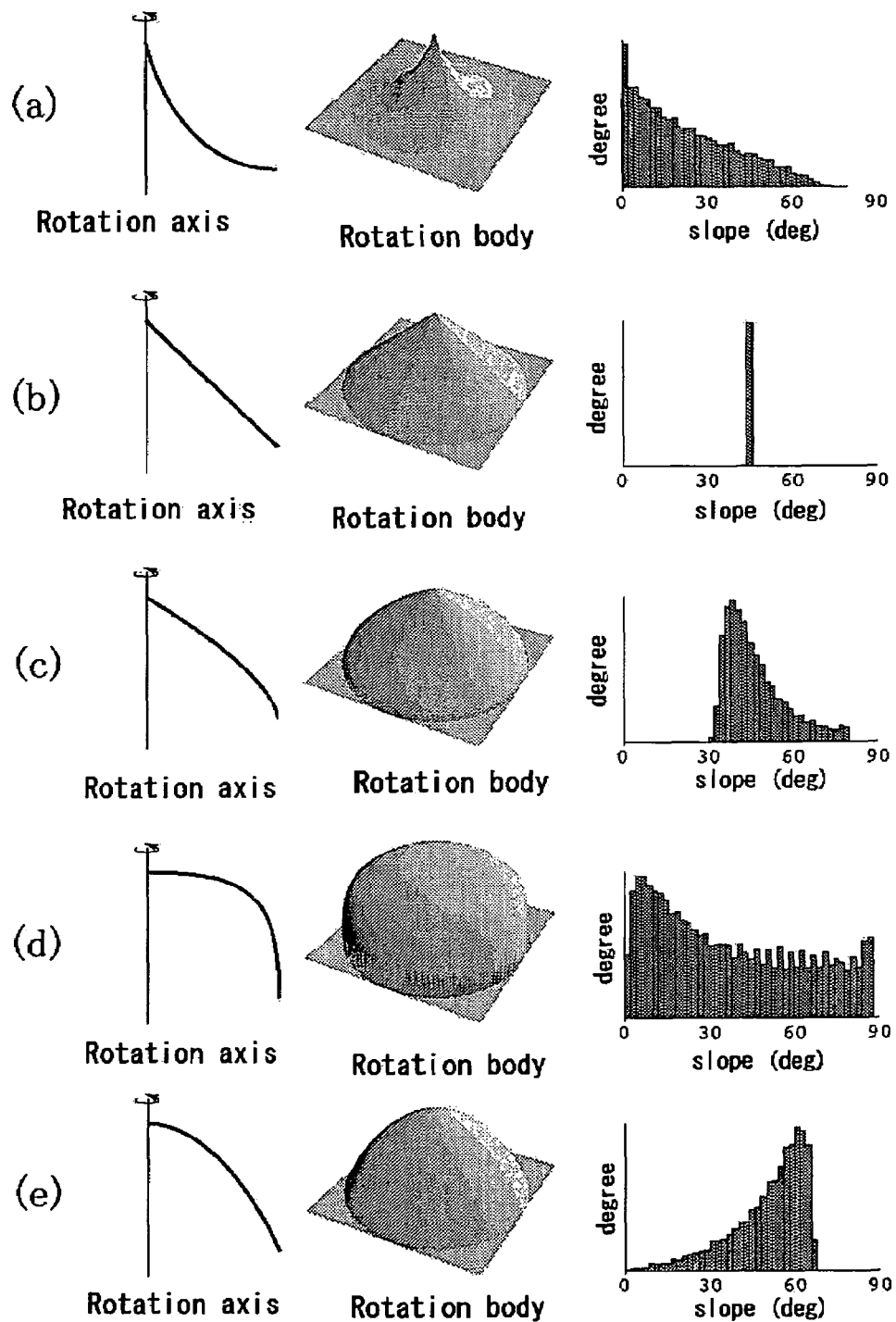
[FIG. 6] Drawings for explaining convex portions of the rough surface of the light control film of the present invention
Figure 7:
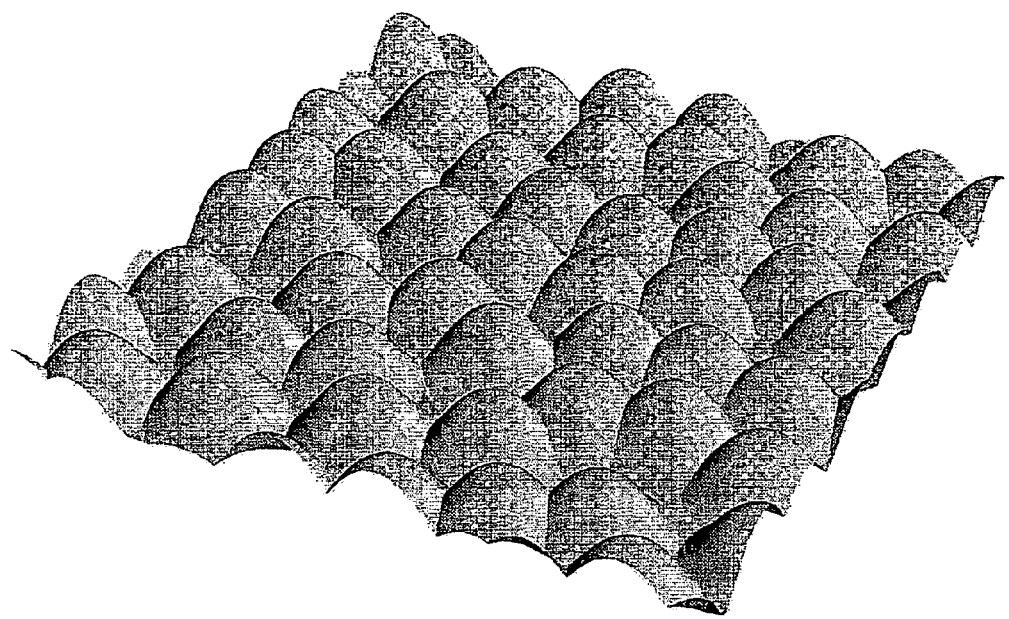
[FIG. 7] Perspective view showing the rough surface of the light control film of the present invention
Figure 8:
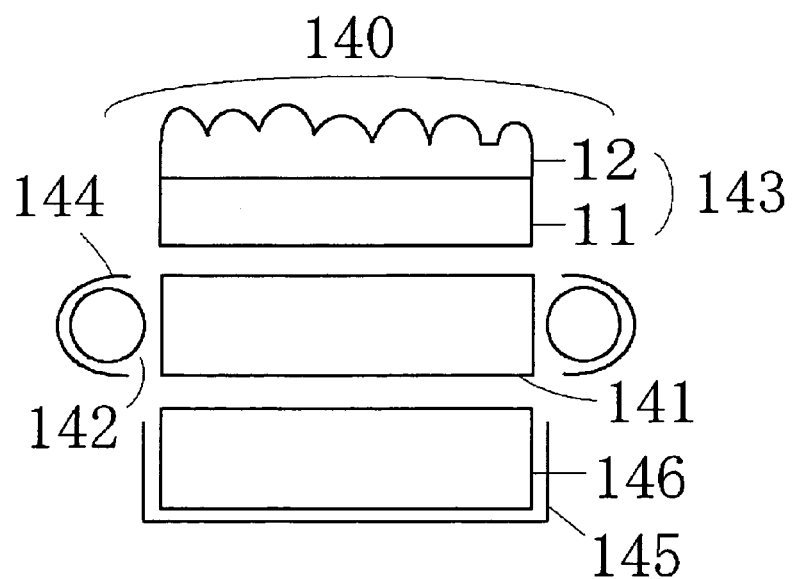
[FIG. 8] Drawing showing an embodiment of the backlight unit of the present invention
Figure 9:
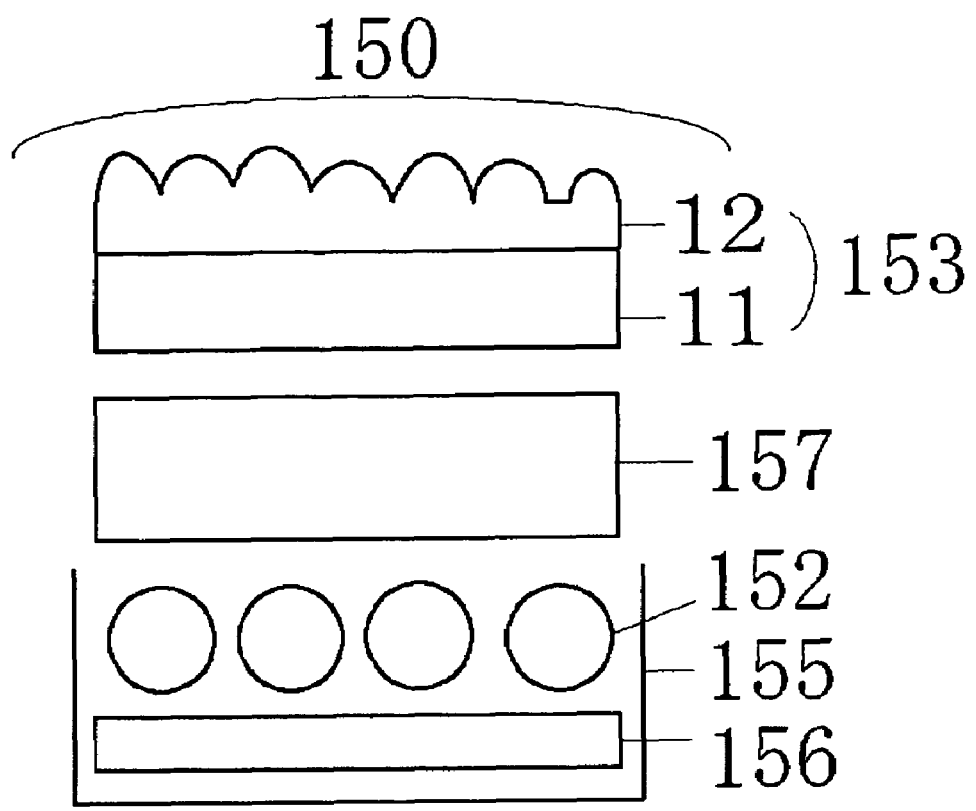
[FIG. 9] Drawing showing an embodiment of the backlight unit of the present invention

The invention claimed is:

1. A light control film having a rough surface as one surface and a substantially smooth surface as the other surface, wherein total light transmission of the film for light entering from the smooth surface is not more than 65% and not less than 20% as measured according to the measurement method defined in JIS K7361-1:1997, and wherein haze is not less than 60% as determined by the measurement method defined in JIS K7136:2000.

2. A backlight unit comprising a light guide plate equipped with a light source on at least one end portion thereof and having a light emergent surface approximately perpendicular to the end portion and a light control film according to claim 1 provided on the light emergent surface of the light guide plate.

3. The backlight unit according to claim 2, wherein the light control film is disposed so that the substantially smooth surface faces the light guide plate.

4. The backlight unit according to claim 2, wherein a prism sheet is used between the light control film and the light guide plate.

5. A backlight unit comprising a light source, a light diffusive plate provided on one side of the light source and a light control film according to claim 1 provided on the side of the light diffusive plate opposite to the light source side.

6. The backlight unit according to claim 5, wherein the light control film is disposed so that the substantially smooth surface faces the light source.

7. The backlight unit according to claim 5, wherein a prism sheet is used between the light control film and the light guide plate.

8. A light control film having a rough surface as one surface and a substantially smooth surface as the other surface, wherein total light transmission of the film for light from the smooth surface is not more than 65%, total light transmission of the film for light entering from the rough surface is not less than 80%, as measured according to the measurement method defined in JIS K7361-1:1997, and a value obtained by subtracting the total light transmission for smooth surface incidence from the total light transmission for rough surface incidence is not less than 30% total light transmission, the light control film having a haze of not less than 60% as determined by the measurement method defined in JIS K7136:2000.

9. A backlight unit comprising a light guide plate equipped with a light source on at least one end portion thereof and having a light emergent surface approximately perpendicular to the end portion and a light control film according to claim 8 provided on the light emergent surface of the light guide plate.

10. The backlight unit according to claim 9, wherein the light control film is disposed so that the substantially smooth surface faces the light guide plate.

11. The backlight unit according to claim 9, wherein a prism sheet is used between the light control film and the light guide plate.

12. A backlight unit comprising a light source, a light diffusive plate having one side facing the light source and a light control film according to claim 8 provided on a side of the light diffusive plate opposite the light source.

13. The backlight unit according to claim 12, wherein the light control film is disposed so that the substantially smooth surface faces the light guide plate.

14. The backlight unit according to claim 12, wherein a prism sheet is used between the light control film and the light guide plate.

15. A light control film having a rough surface as one surface and a substantially smooth surface as the other surface, wherein:
    total light transmission of the film for light entering from the smooth surface is not more than 65% and not less than 20% as measured according to the measurement method defined in JIS K7361-1:1997, and wherein haze is not less than 60% as determined by the measurement method defined in JIS K7136:2000; and
    the rough surface is formed of multiple convex portions, each of the convex portions being defined by rotation of a curve around a central rotational axis.

16. A backlight unit comprising a light guide plate equipped with a light source on at least one end portion thereof and having a light emergent surface approximately perpendicular to the end portion and a light control film according to claim 15 provided on the light emergent surface of the light guide plate.

17. The backlight unit according to claim 16 wherein the light control film is arranged with its substantially smooth surface facing the light guide plate.

18. The backlight unit according to claim 16 additionally comprising a prism sheet between the light control film and the light guide plate.

19. A backlight unit comprising a light source, a light diffusive plate provided on one side of the light source and a light control film according to claim 15 on a side of the light diffusive plate opposite the light source.

20. The backlight unit according to claim 19, wherein the light control film is disposed so that the substantially smooth surface faces the light source.

21. The backlight unit according to claim 19, additionally comprising a prism sheet between the light control film and the light guide plate.

22. The light control film according to claim 15 wherein haze is not less than 60% as determined by the method of measurement defined in JIS K7136:2000.

23. A light control film having a rough surface as one surface and a substantially smooth surface as the other surface, wherein:

total light transmission of the film for light from the smooth surface is not more than 65%, total light transmission of the film for light entering from the rough surface is not less than 80%, as measured according to the measurement method defined in JIS K7361-1:1997, and a value obtained by subtracting the total light transmission for smooth surface incidence from the total light transmission for rough surface incidence is not less than 30% total light transmission, the light control film having a haze of not less than 60% as determined by the measurement method defined in JIS K7136:2000; and the rough surface is formed of multiple convex portions, each of the convex portions being defined by rotation of a curve around a central rotational axis.

24. A backlight unit comprising a light guide plate equipped with a light source on at least one end portion thereof and having a light emergent surface approximately perpendicular to the end portion and a light control film according to claim 23 provided on the light emergent surface of the light guide plate.

25. The backlight unit according to claim 24 wherein the light control film is arranged with its substantially smooth surface facing the light guide plate.

26. The backlight unit according to claim 24 additionally comprising a prism sheet between the light control film and the light guide plate.

27. The backlight unit comprising a light source, a light diffusive plate provided on one side of the light source and a light control film according to claim 23 provided on a side of the light diffusive plate opposite the light source.

28. The backlight unit according to claim 27, wherein the light control film is disposed so that the substantially smooth surface faces the light guide plate.

29. The backlight unit according to claim 27, additionally comprising a prism sheet between the light control film and the light guide plate.

30. The light control film according to claim 23 wherein haze is not less than 60% as determined by the method of measurement defined in JIS K7136:2000.

* * * * *